United States Patent [19]

Adams et al.

[11] Patent Number: 4,795,168
[45] Date of Patent: Jan. 3, 1989

[54] MAGNETIC SEAL ASSEMBLY

[75] Inventors: William V. Adams, Scotts; Duane A. Avard, Schoolcraft; Leroy A. Waling, Parchment, all of Mich.

[73] Assignee: Durametallic Corporation, Kalamazoo, Mich.

[21] Appl. No.: 161,413

[22] Filed: Feb. 23, 1988

Related U.S. Application Data

[63] Continuation of Ser. No. 95,557, Sep. 10, 1987, abandoned.

[51] Int. Cl.$^4$ ............................................. F16J 15/54
[52] U.S. Cl. .................................. 277/80; 277/81 R; 277/85
[58] Field of Search .................. 277/1, 80, 81 R, 85

[56] References Cited

U.S. PATENT DOCUMENTS

| | | |
|---|---|---|
| 2,843,403 | 7/1958 | Stevenson . |
| 2,883,212 | 4/1959 | Laser ...................................... 277/80 |
| 2,913,289 | 11/1959 | Stevenson ........................... 277/80 X |
| 3,050,319 | 8/1962 | Colby .................................. 277/80 X |
| 3,080,170 | 3/1963 | Colby .................................. 277/80 X |
| 3,170,409 | 2/1965 | McLeod et al. ..................... 277/80 X |
| 3,788,650 | 1/1974 | Place . |

OTHER PUBLICATIONS

Magnetic Seal Corporation Brochure, 4 pages, date unknown.
Chemical Engineering, Nov. 25, 1985, pp. 35–41.
Magnetic Seal Corporation Brochure, 9 pages, date unknown.

*Primary Examiner*—Robert S. Ward
*Attorney, Agent, or Firm*—Flynn, Thiel, Boutell & Tanis

[57] ABSTRACT

A magnetic-type end face seal assembly for creating an airtight seal between a housing and a rotatable shaft which projects outwardly through a housing bore. An insert ring of magnetically attractable material surrounds the shaft within the bore, and has a seating ring of hard synthetic material externally fixed thereto and sealingly engaged with the wall of the housing bore. The insert ring defines a first annular seal face on the outer axial end thereof. A rotating ring arrangement encircles and is nonrotatably coupled to the shaft axially adjacent the insert ring. This rotating ring arrangement includes a ring-shaped magnet which is disposed closely axially adjacent but slightly spaced from the insert ring, and this magnet mounts thereon a face ring which defines a second annular seal face which is maintained in engagement with the first seal face due to the magnetic attraction between the magnet and the insert ring.

16 Claims, 1 Drawing Sheet

U.S. Patent
Jan. 3, 1989
4,795,168
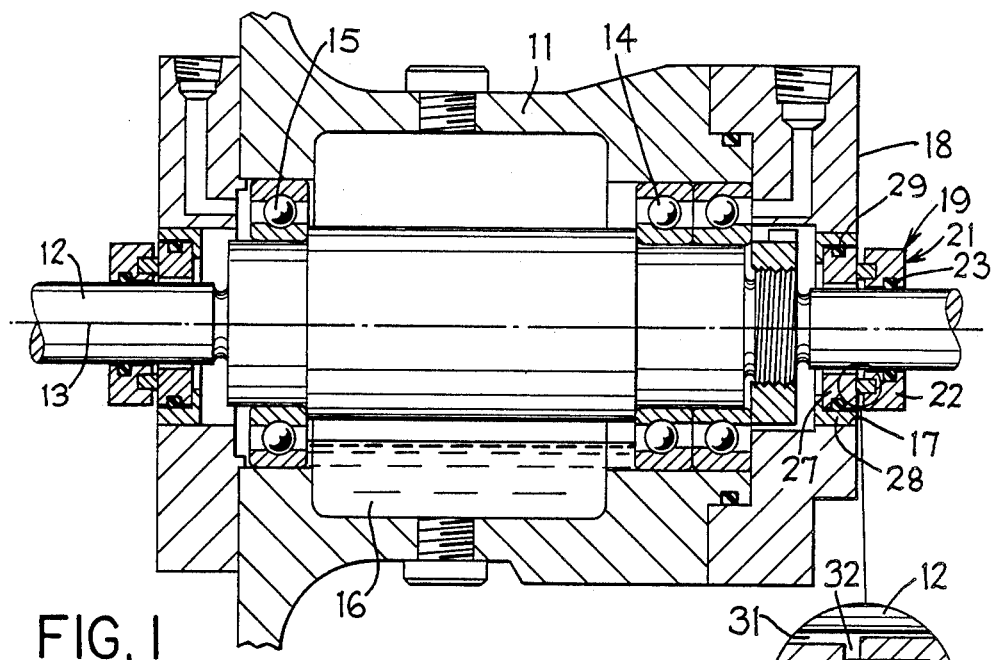
FIG. I
PRIOR ART
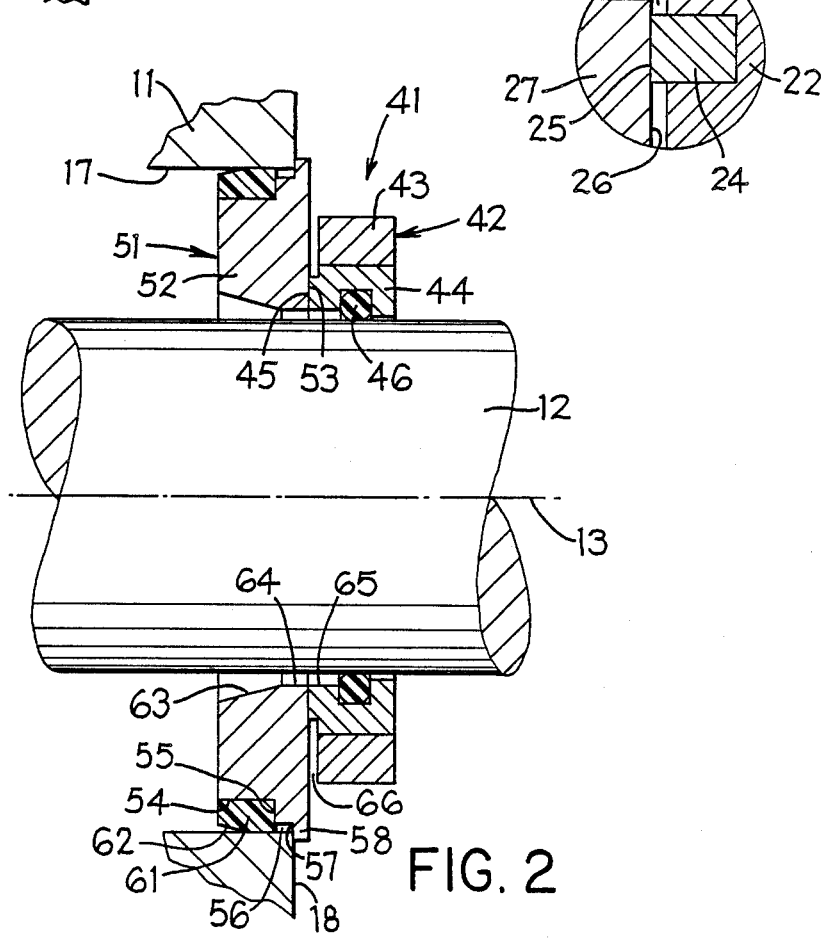
FIG. 2

MAGNETIC SEAL ASSEMBLY

This application is a continuation of U.S. Ser. No. 095,557, filed Sept. 10, 1987, now abandoned.

FIELD OF THE INVENTION

This invention relates to an improved magnetic end face seal assembly, particularly for use as a bearing protection device.

BACKGROUND OF THE INVENTION

Many pumps utilize either lip-type or labyrinth-type seals to sealingly isolate the bearing frames from exterior contamination. For example, it has been common to utilize lip seals coacting between the bearing frame and the rotatable shaft in an attempt to isolate the bearings from exterior contamination. Such lip seals, however, undergo significant wear, and have also been observed to permit undesirable amounts of moisture to pass thereby. Hence, the life of such arrangements is undesirably low. In this regard, it has been observed that the presence of even small quantities of moisture within the oil reservoir of the bearing frame, such as no more than about 0.002% moisture in the oil, is sufficient to reduce bearing fatigue life by as much as 48%.

To avoid use of lip seals, some pumps have adopted the use of labyrinth-type seals involving closely interfitting stator and rotor rings which do not physically contact but define a narrow labyrinth passage therebetween. While labyrinth sealing devices are in many cases effective for keeping out many types of external contaminants, nevertheless they still permit passage of air therethrough. Due to normal hot/cold cycles, or contact of cool air with the hot equipment, condensation occurs within the bearing frame and hence permits moisture to contaminate the oil.

To resolve this problem, attempts have been made to utilize a sealing device which totally seals the bearing frame. Such attempt has related to the development and use of a magnetic-type mechanical end face seal cooperating between the bearing frame and the rotatable shaft. Such arrangement, an example of which is illustrated by FIG. 1, provides a much improved airtight seal. However, known magnetic-type end face seals have nevertheless still possessed structural or operational features which have severely restricted or limited the application of such devices. For example, the known devices have typically required the use of a separate insulator for mounting the magnetic insert into the bearing frame bore, thereby undesirably increasing the structural complexity and cost. The known arrangement has also typically utilized a conventional elastomeric O-ring for sealingly mounting the magnetic insert within the insulator ring, and such has typically caused the insert ring to tilt or assume an "out-of-square" position which interferes with proper operation of the seal assembly. This "out-of-square" is caused by the elastic distortion or roll of the O-ring during insertion. This known arrangement also typically creates an interior annular space between the opposed seal rings which tends to collect oil, which oil can not properly drain back to the bearing sump, and hence ultimately leaks between the seal faces.

Thus, it is an object of this invention to provide an improved magnetic end face seal assembly which substantially overcomes or improves upon many of the aforementioned disadvantages.

More specifically, the present invention relates to an improved magnetic end face seal assembly wherein the stationary seal ring (i.e., stator) functions as an insert for positioning within the bore of the bearing frame, this insert being a magnetically attractable material, and wherein the rotating seal ring (i.e., rotor) as coupled to the shaft is of a magnetic material and mounts thereon a seal face member which is magnetically urged into sealing engagement with an end face of the seal stator.

In the improved magnetic end face seal, the insert preferably has a seating ring of a hard nonmagnetic material mounted thereon so as to permit direct and substantially rigid but sealed mounting of the insert into the bore of the bearing housing, which support ring also prevents the insert from cocking or going out of square seal.

Further, in the improved magnetic end face the opposed seal faces and their respective supporting rings have substantially identical inner diameters so that the clearance between the shaft and the rings does not create grooves or pockets which tend to trap oil, and such oil can readily drain back to the bearing sump.

Other objects and purposes of the invention will be apparent to persons familiar with structures of this general type upon reading the following specification and inspecting the accompanying drawings.

BRIEF DESCRIPTION OF THE DRAWINGS

FIG. 1 is a central sectional view illustrating a bearing frame supporting a shaft, and having a conventional magnetic end face seal associated therewith.

FIG. 2 is a fragmentary sectional view illustrating the improved magnetic end face seal assembly of this invention and its cooperation between the shaft and bearing frame.

Certain terminology will be used in the following description for convenience in reference only, and will not be limiting For example, the words "upwardly", "downwardly", "leftwardly" and "rightwardly" will refer to directions in the drawings to which reference is made. The words "inwardly" and "outwardly" will refer to directions toward and away from the geometric center of the seal assembly and designated parts thereof. The word "inwardly" will also refer to a direction which points inwardly toward the bearing sump, this being leftwardly in FIG. 2, and the word "outwardly" will refer to the opposite direction or side, this being rightwardly in FIG. 2. Said terminology will include the words specifically mentioned, derivatives thereof, and words of similar import.

DETAILED DESCRIPTION

Referring to FIG. 1, there is illustrated a conventional bearing arrangement in association with a conventional magnetic-type end face seal assembly.

More specifically, this conventional arrangement includes a bearing frame or housing 11 for rotatably supporting a shaft 12 which rotates about its axis 13. Conventional anti-friction bearings 14 and 15 rotatably support the shaft. The housing defines an oil reservoir 16 therein for lubrication of the bearings. An enlarged bore or opening 17 opens outwardly through the end face 18 of the housing for permitting outward projection of the shaft 12. A conventional magnetic-type mechanical end face seal assembly 19 cooperates between the rotatable shaft 12 and the stationary housing 11 to sealingly isolate the reservoir 16 from the environment.

This conventional magnetic end face seal assembly 19 includes a rotating ring (rotor) assembly 21 formed by a support ring 22 which is disposed externally of the housing in surrounding relationship to the shaft 12. This ring 22 is sealingly and drivingly engaged with the shaft by a conventional elastomeric O-ring 23. The support ring 22 has an annular groove formed in the inner face thereof, which groove mounts therein a face ring 24, the latter conventionally being of carbon. This face ring 24 projects axially inwardly beyond the inner axial end surface of the ring 22 and, at its inner axial end, defines an annular seal face 25 which is maintained generally in a plane which is substantially perpendicular to the axis 13.

The seal assembly 19 also includes a nonrotating ring (i.e., a stator) 27 which is positioned within the housing bore 17 and is mounted so as to be sealingly and nonrotatably coupled to the bearing housing 11. This nonrotating ring 27 has a seal face 26 formed on the axially outer end surface thereof, whereby the opposed seal faces 25-26 are maintained in flat but relatively rotatable contact with one another to create a sealed relationship therebetween.

The nonrotating ring 27 comprises a magnet, and thus is formed of a magnetizable material In contrast, the rotating support ring 22 is formed of a magnetically attractable material (namely a conventional ferrite material such as steel) so that it is magnetically attracted axially inwardly toward the stationary magnet 27 to hence maintain the opposed seal faces 25-26 in snug contact with one another.

The magnet 27, commonly referred to as the "insert", is nonrotatably secured to the housing through an intermediate ring 28 which surrounds the insert 27 and is snugly seated against the surrounding wall defining the bore 17. This intermediate mounting ring 28 functions as an insulator so as to isolate the magnet 27 from the housing 11 inasmuch as the latter is typically of ferrite material, such as cast iron or steel.

To create a sealed relationship between the insert 27 and housing 11, there is also provided a conventional elastomeric O-ring 29 disposed for sealing cooperation between the insulator ring 28 and the insert 27. Such O-ring, however, has been observed to be disadvantageous since, during installation, the compression of the O-ring and the accompanying axial movement which occurs due to axial insertion of the insert into the insulator causes axial rolling and hence elastic distortion of the O-ring. Such can cause substantial "spring-back", and has been observed to often cause significant cocking or tilting of the insert so that the end face 26 thereof is no longer in the desired perpendicular relationship relative to the shaft axis (this being commonly known as "out-of-square").

In addition, this conventional arrangement of FIG. 1 provides an annular clearance passage 31 between the shaft and the insert 27, this passage 31 at its inner end communicating with the oil reservoir so that oil can splash into this passage. Passage 31 at its axially outer end, however, terminates in a radially outwardly projecting annular groove 32 as defined between the rings 22 and 27, this groove 32 being bounded by the face ring 24. This groove 32 is created by the fact that the inner diameter of the seal face 26 is smaller than the inner diameter of the seal face 25. This groove 32 tends to collect therein oil which splashes into and through the passage 31, which oil can not readily flow back to the reservoir, and hence some of this oil invariably leaks between the seal faces 25-26.

Referring now to FIG. 2, there is illustrated an improved magnetic end face seal assembly 41 according to the present invention, which assembly cooperates between the stationary housing 11 and the rotatable shaft 12.

The seal assembly 41 includes a rotating ring (rotor) assembly 42 which surrounds and is sealingly and nonrotatably coupled to the shaft 12. This rotor assembly includes a support ring 43 which mounts therein a face ring 44, the latter being typically constructed of carbon. Face ring 44 protrudes axially beyond the support ring 43 and defines a seal face 45 on the inner axial end surface thereof. This seal face 45, as is conventional, extends substantially perpendicular with respect to the shaft axis 13. In addition, an elastomeric O-ring 46 (such as of Viton or Buna "N") is confined by a groove within the ring 44 to nonrotatably and sealingly couple the rotor assembly to the shaft. The rings 43 and 44 have an interference or press fit therebetween to fixedly couple them together The ring 43 comprises a magnet and is formed of a magnetizable material. The material defining the magnet 42 may be of several known types, such as barium ferrite (ceramic), Alnico 5, Alnico 8 or neodymium in a plastic base. In the preferred embodiment, magnet 42 is of Alnico 5.

The rotor assembly 42 is disposed adjacent and cooperates with a stationary ring or stator assembly 51 which is nonrotatably and sealingly seated within the open end of the housing bore 17. This stator assembly 51 includes a stationary ring or insert 52 which defines a seal face 53 on the outer axial end surface thereof, which seal face 53 is oriented in a plane which is perpendicular to the shaft axis and is maintained in relatively rotatable but sliding contacting engagement with the opposed seal face 45.

The insert ring 52 is of a magnetically attractable material so that it will cooperate with the magnet 43 to create a strong axially directed magnetic attraction therebetween to hence maintain the opposed seal faces 45 and 53 in proper engagement with one another. Hence, the insert 52 can be constructed of conventional steel, although the insert is preferably provided with a protective surface treatment, such as a nickel/chrome protective plating, or a chrome oxide facing.

The insert ring 52 has an exterior annular wall which is of a stepped configuration as it projects axially, there being two such steps in the preferred embodiment. More specifically, the insert ring has an outer annular wall 54 which projects axially from its inner end surface, this annular wall 54 terminating at an axially intermediate annular shoulder 55 which projects radially outwardly This shoulder 55 joins to a further annular wall 56 which is of larger diameter than the annular wall 54 but of lesser diameter than the housing bore 17, whereby this annular wall 56 projects axially until joining a second annular shoulder 57 which again projects radially outwardly. This latter shoulder results in the defining of an annular flange 58 which projects outwardly through a sufficient radial extent so as to radially overlap the housing end wall 18. This enables the shoulder 57 to be axially seated against the end wall 18.

The insert 52 has an annular seating member 61 stationarily mounted thereon in encircling relationship thereto. This seat member 61 has a blocklike cross section in that it has an inner annular wall which is stationarily seated against the annular wall 54 of the insert, this being preferably created by means of an interference or press fit between the insert and the seating member. The seating member 61 also has an outer axial end face which abuts against the inner shoulder 55.

Seating member 61 has an outer annular wall 62 which is of increasing diameter as it projects axially from its inner to its outer axial end. That is, this annular wall 62 adjacent the inner axial end (the leftward end in FIG. 2) of the seating member has a diameter which is less than the diameter of housing bore 17. The diameter of this outer annular wall 62 progressively increases axially (from left to right in FIG. 2) across about one-third the axial width of the wall until reaching a maximum diameter which slightly exceeds the diameter of bore 17 when the seat member 61 is in a nondeformed condition This latter diameter extends axially across the remaining width. When in the nondeformed condition, the maximum diameter of wall 62 preferably exceeds the bore diameter 17 by an amount which is normally in the range of between about 0.005 and about 0.011 inch, although this magnitude will undoubtedly vary with the size of the ring.

The seat member 61 is preferably constructed of a relatively hard plastic or synthetic resin material having a durometer of at least about A95 so that it will have only extremely limited springability or resiliency. Upon insertion into the housing bore 17, only a limited compression of the seat member 61 will occur adjacent the axially outer end thereof, which compression will create a snug stationary support of the insert and will also create a sealed engagement with the housing. This prevents spring-back (i.e., axial bulging), and enables the insert and specifically its seal face 53 to be maintained in perpendicular relationship to the shaft axis with a high degree of accuracy.

The material defining the seat member 61 should also have a very low coefficient of friction to facilitate its insertion into the housing bore 17 and thus minimize any tendency for the material of the insert to roll or spring back.

In the preferred embodiment, the seat member 61 is constructed of Teflon, such as graphite-filled or glass-filled Teflon. However, other materials having properties similar to Teflon can also be utilized. For example, Ryton is one suggested alternative material. The material preferably should have a Shore A durometer hardness of at least about 95. The material must also exhibit little axial bulging (less than about 0.002 inch) due to its compressive fit within the housing bore.

The insert 52 has an opening extending axially therethrough which is larger than the diameter of shaft 12, which opening includes a bore 64 which is of substantially uniform diameter and opens inwardly from the seal face 53. This latter bore 64, however, projects only part way through the insert, at which point it merges with a further coaxially aligned bore 63 which is tapered in that it diverges radially outwardly as it projects axially for communication with the inner axial end surface of the insert. A still further bore 65 is defined within the face ring 44, which bore 65 defines the inner diameter of the seal face 45 and is in open communication with the bores 63-64. The bores 64-65, and hence the inner diameters of the seal faces 45 and 53, are of equal diameter Thus, any lubricant which splashes into the bores 63-65 will not be readily trapped therein, but can flow axially inwardly back to the reservoir, this being facilitated by the diverging or enlarged taper of the bore 63.

The magnet 43 and the magnetically attractable insert 52 are maintained with a small axial spacing or gap 66 therebetween.

In operation, rotation of shaft 12 causes corresponding rotation of the rotor assembly 42. The magnetic attraction created between the magnet 43 and the insert 52 causes the rotor assembly 42 to be urged leftwardly in FIG. 2 so that the seal face 45 on the rotor is magnetically held firmly against the opposed seal face 53 on the insert. The shaft rotation results in relative sliding rotation between the faces 45 and 53, which faces are effective in creating a seal therebetween to prevent outward leakage of lubricant, and at the same time prevent inward leakage of contaminants including water or moisture-laden air.

The presence of the seat member 61, and specifically the manner in which it structurally and functionally cooperates between the insert and the housing sealingly and stationarily supports the insert while maintaining the shoulder 57 as defined on the inner face of the flange 58 properly "squared up" against the housing face 18. This prevents undesired tilting of the seal face 53, whereby a proper sliding seal can thus be maintained between the opposed contacting seal faces 45 and 53.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A magnetic-type end face seal assembly for creating a sealed relationship between a housing and a rotatable shaft which projects coaxially outwardly from a bore which opens inwardly from an end wall of the housing, said seal assembly comprising:

annular insert means stationarily positioned within said bore in surrounding relationship to said shaft, said insert means comprising a one-piece insert ring of magnetically attractable material, said insert ring having bore means extending axially therethrough and of a diameter larger than said shaft so that said shaft can project through said bore means free of contact with said insert ring;

said insert ring defining a substantially planar annular first seal face on an outer axial end surface thereof;

said insert means including a seat member formed as a one-piece ring disposed in external encircling relationship to said insert ring, said seat member being stationarily and fixedly mounted on said insert ring and having a noncircular cross section;

said seat member being of a hard synthetic resin material having only little elasticity, said seat member when in a nondeformed condition having a maximum outer diameter which slightly exceeds the diameter of said housing bore so that the seat member undergoes a very small radial deformation when inserted into said bore to create a stationary and sealed engagement with the wall defining the housing bore;

rotating ring means disposed in surrounding relationship to and nonrotatably coupled to said shaft for rotation therewith, said rotating ring means being positioned axially adjacent said insert means;

said rotating ring means including a first ring member comprising a magnet, said first ring member being radially spaced in its entirety from said shaft and being positioned closely axially adjacent but separated from said insert ring by a small axial gap, said magnet cooperating with said insert ring to create a magnetic attracting force which tends to urge said rotating ring means and said insert means axially toward one another;

said rotating ring means also including a second ring member concentrically and stationarily mounted on said magnet, said second ring member having a substantially planar annular second seal face formed on an inner axial end surface thereof, said second seal face being disposed in a plane which is substantially perpendicular to the axis of said shaft, said second seal face being positioned directly opposite and maintained in engagement with said first seal face due to the magnetic attracting force between said magnet and said insert ring.

2. An assembly according to claim 1, wherein said insert ring includes a radially outwardly projecting annular flange adjacent the outer axial end surface thereof which projects outwardly in radially overlapping and abutting contact with the end wall of the housing in surrounding relationship to the housing bore.

3. An assembly according to claim 1 wherein said first and second seal faces are defined by substantially equal inner diameters which are greater than the shaft diameter to define an annular clearance space therebetween, and said insert ring having a truncated conical bore which extends axially from said clearance space in diverging relationship relative to said shaft through the inner axial end surface of said insert ring.

4. An assembly according to claim 1, wherein said second ring member is constructed of carbon and has a bore therethrough for permitting passage of said shaft, said second ring member having an annular groove formed therein so as to open radially outwardly from said last-mentioned bore, said groove being spaced inwardly from opposite axial end surfaces of said second ring member, and elastomeric sealing ring means disposed within said groove and maintained in compressive sealing engagement with said shaft for creating a sealed and nonrotatable engagement between said shaft and said rotating ring means.

5. An assembly according to claim 4, wherein said magnet wholly externally surrounds said second ring member and is fixedly coupled thereto by a press or interference fit.

6. An assembly according to claim 1, wherein said seat member is of a blocklike cross section and has an outer annular surface which progressively increases in diameter as the outer annular surface extends from an axially inner location to an axially outer location, said outer annular surface at the axially inner location being of a diameter less than the diameter of said housing bore, and said outer annular surface in the vicinity of the outer axial location being of a diameter greater than the housing bore diameter when the seat member is in a nondeformed condition.

7. An assembly according to claim 6, wherein the seat member and the insert ring have an interference or press fit therebetween for fixedly securing the seat member and insert ring together, and wherein the seat member axially abuts an axially inwardly facing shoulder defined on the insert ring.

8. An assembly according to claim 7, wherein said seat member is constructed of polytetrafluoroethylene (Teflon) having a Shore A durometer hardness of at least about 95.

9. A magnetic-type end face seal assembly for creating a sealed relationship between a housing and a rotatable shaft which projects coaxially outwardly from a bore which opens inwardly from an end wall of the housing, said seal assembly comprising:

annular insert means stationarily positioned within said bore in surrounding relationship to said shaft, said insert means including a one-piece insert ring of magnetically attractable material, said insert ring having bore means extending axially therethrough and of a diameter larger than said shaft so that said shaft can project through said bore means free of contact with said insert ring;

said insert ring defining a substantially planar annular first seal face on an outer axial end surface thereof;

said insert means including a seat member formed as a one-piece ring disposed in external and circling relationship to said insert ring, said seat member being stationarily and fixedly mounted on said insert ring and having a noncircular cross section;

said seat member being of a hard synthetic resin material having only little elasticity, said seat member when in a nondeformed condition having a maximum outer diameter which slightly exceeds the diameter of said housing bore so that the seat member undergoes a very small radial deformation when inserted into id bore to create a stationary and sealed engagement with the wall defining the housing bore;

rotating ring means disposed in surrounding relationship to and nonrotatably coupled to said shaft for rotation therewith, said rotating ring means being positioned axially adjacent said insert means;

said rotating ring means including a ring member having a substantially planar annular second seal face formed on an inner axial end surface thereof, said second seal face being disposed in a plane which is substantially perpendicular to the axis of said shaft, said second seal face being positioned directly opposite and maintained in engagement with said first seal face; and said rotating ring means also including magnet means stationarily mounted on said ring member, said magnet means being radially spaced from said shaft and positioned closely axially adjacent but separated from said insert ring by a small axial gap, said magnet means cooperating with said insert ring to create a magnetic attracting force which tends to urge said rotating ring means and said insert means axially toward one another for maintaining said first and second seal faces in engagement with one another.

10. An assembly according to claim 9, wherein said magnet means comprises a ring shaped part which encircles said ring member.

11. An assembly according to claim 9, wherein said ring member is constructed of carbon and has a bore therethrough for permitting passage of said shaft, said ring member having an annular groove formed therein so as to open radially outwardly from said last-mentioned bore, said groove being spaced inwardly from opposite axial end surfaces of said ring member, and elastomeric sealing ring means disposed within said groove and maintained in compressive sealing engagement with said shaft for creating a sealed and nonrotatable engagement between said shaft and said rotating ring means.

12. An assembly according to claim 11, wherein said magnet means externally surrounds said ring member and is fixedly coupled thereto.

13. An assembly according to claim 9, wherein said seat member is of a blocklike cross section and has an outer annular surface which increases in diameter as the outer annular surface extends from an axially inner location to an axially outer location, said outer annular surface at the axially inner location being of a diameter less than the diameter of said housing bore, and said outer annular surface in the vicinity of the outer axial location being of a diameter greater than the housing bore diameter when the seat member is in a nondeformed condition.

14. An assembly according to claim 13, wherein the seat member and the insert ring have an interference or press fit therebetween for fixedly securing the seat member and insert ring together, and wherein the seat member axially abuts an axially inwardly facing shoulder defined on the insert ring.

15. An assembly according to claim 14, wherein said insert ring includes a radially outwardly projecting annular flange adjacent the outer axial end surface thereof which projects outwardly in radially overlapping and abutting contact with the end wall of the housing in surrounding relationship to the housing bore.

16. A magnet-type end seal assembly for creating a sealed relationship between a housing and a rotatable shaft which projects axially outwardly from a bore which opens inwardly from an end wall of the housing, said seal assembly comprising:

annular insert means stationarily positioned within said bore in surrounding relationship to said shaft, said insert means including a one-piece insert ring of magnetically attractable material, said insert ring having bore means extending axially therethrough and of a diameter larger than said shaft so that said shaft can project through said bore means free of contact with said insert ring;

said insert ring defining a substantially planar annular first seal face on an outer axial end surface thereof;

said insert ring including a radially outwardly projecting annular flange adjacent the outer axial end surface thereof for projecting outwardly and radially overlapping and abutting contact with the end wall of the housing in surrounding relationship to the housing bore;

said insert means including a seat member formed as a one-piece ring disposed in external and circling relationship to said insert ring, said seat member when in a nondeformed condition having a maximum outer diameter which slightly exceeds the diameter of said housing bore so that the seat member undergoes radially elastic deformation when inserted into said bore to create a stationary and sealed engagement with the wall defining the housing bore;

rotating ring means disposed in surrounding relationship to and nonrotatably coupled to said shaft for rotation therewith, said rotating ring means being positioned axially adjacent said insert means;

said rotating ring means including a ring member having a substantially planar annular second seal face formed on an inner axial end surface thereof, said second seal face being disposed in a plane which is substantially perpendicular to the axis of said shaft, said second seal face being positioned directly opposite and maintained in engagement with said first seal face;

said ring member being constructed of carbon and having a bore therethrough for permitting passage of said shaft, said ring member having an annular groove formed therein so as to open radially outwardly from said last-mentioned bore, said groove being spaced inwardly from opposite axial end surfaces of said ring member, and elastomeric sealing ring means disposed within said groove and maintained in compressive sealing engagement with said shaft for creating a sealed and nonrotatable engagement between said shaft and said rotating ring means; and said rotating ring means also including magnet means stationarily mounted on said ring member, said magnet means being radially spaced from shaft and positioned closely axially adjacent but separated from said insert ring by a small axial gap, said magnet means cooperating with said insert ring to create a magnetic attracting force which tends to urge said rotating ring means and said insert means axially toward one another for maintaining said first and second seal faces in engagement with one another.

* * * * *

UNITED STATES PATENT AND TRADEMARK OFFICE
CERTIFICATE OF CORRECTION

PATENT NO. : 4 795 168
DATED : January 3, 1989
INVENTOR(S) : William V. Adams et al It is certified that error appears in the above-identified patent and that said Letters Patent is hereby corrected as shown below:

Column 8, line 33; change "id" to ---said---.

Signed and Sealed this

First Day of August, 1989

Attest:

DONALD J. QUIGG

Attesting Officer

Commissioner of Patents and Trademarks